Patented Mar. 22, 1949

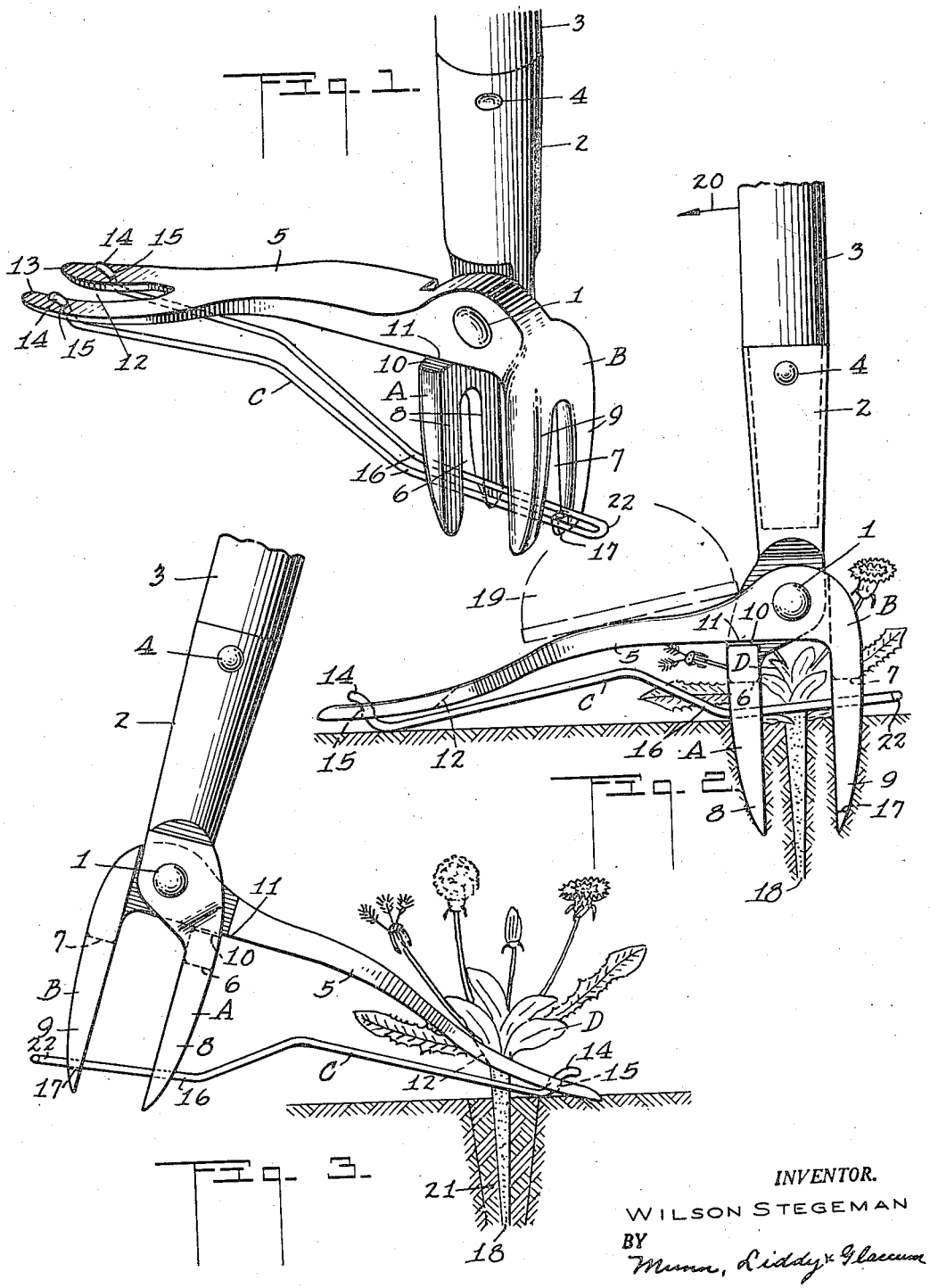

2,465,129

UNITED STATES PATENT OFFICE 2,465,129

WEED PULLER

Wilson Stegeman, Santa Rosa, Calif.

Application April 23, 1946, Serial No. 664,245

3 Claims. (Cl. 254—132)

The present invention relates to improvements in a weed puller, and it consists of the combinations, constructions and arrangement of parts hereinafter described and claimed.

An object of my invention is to provide a weed puller, which is an improvement over the weed puller disclosed in expired United States Letters Patent No. 1,065,606, issued on June 24, 1913, to Morris C. Hayes. I have found from practice that the patented weed puller removes a large amount of dirt when it is used, leaving large and unsightly holes in the lawn or the like from which the weeds are removed. For instance, dandelions have long tap roots and many gardeners dig up considerable amount of dirt when pulling out this type of weed with the patented puller mentioned above, and also when using other conventional pullers.

Moreover, the spaces defined between the prongs in the patented puller often become clogged with dirt and weeds. This is especially true during wet weather, since mud will readily clog the prongs.

In this invention, I provide a weed puller that is adapted for removing weeds from lawns and the like, without tearing up the ground unnecessarily. I further provide means in combination with the puller prongs for automatically ejecting dirt, mud, weeds or other fouling material from the prongs when the latter are withdrawn from the ground. Accordingly, the gardener does not need to clean the prongs with his hands or a stick, as required when using the patented puller hereinbefore identified.

A further object of my invention is to construct a weed puller that is particularly well adapted for loosening the ground around the tap root and slightly raise the plant so as to facilitate its later removal. I provide means engageable with the top of the loosened weed and ground for holding both in place when the pronged jaws of the puller are withdrawn from the ground.

More specifically described, the plant and ground-engaging means consists of a spring arranged between the prongs of the jaws. Upon forcing the prongs into the ground, this spring is placed under additional tension, and as the prongs are withdrawn, the spring maintains contact with the loosened plant and ground and holds them in place. At the same time, any material tending to foul the prongs is ejected therefrom. The minimum amount of soil is disturbed with my puller, and the gardener avoids an otherwise necessary messy removal of dirt and weeds from between the jaws of the puller.

Other objects and advantages will appear as the specification proceeds, and the novel features of my invention will be set forth in the appended claims.

For a better understanding of my invention reference should be had to the accompanying drawing, forming part of this application, in which:

Figure 1 is a perspective view of my weed puller;

Figure 2 is a side elevation thereof showing the pronged jaws pressed into the ground in straddling relation with a weed to be removed and disclosing the spring under increased tension; and Figure 3 illustrates the claw end of the puller engaging with a weed preparatory to removing the latter.

While I have shown only the preferred form of my invention, it should be understood that various changes, or modifications, may be made within the scope of the annexed claims without departing from the spirit thereof.

In carrying my invention into practice, I provide a pair of pronged jaws A and B, which are swingably secured together, as at 1. The jaw A has a ferrule 2 formed integral therewith, and a handle 3 of the desired length is fastened to the ferrule by any suitable means, such as a rivet 4. The jaw B is fashioned with a lever 5 projecting therefrom.

It will be noted that the jaws A and B are bifurcated at 6 and 7, respectively. This construction presents a pair of spaced-apart prongs 8 on the jaw A, while the jaw B is provided with spaced prongs 9, as clearly disclosed in Figure 1. When the jaws are separated to the point substantially as shown in Figure 2, a shoulder 10 on the jaw A abuts the underneath surface 11 of the jaw B, thus preventing further separation of the pronged jaws.

Referring to Figure 1, I have shown the free end of the lever 5 as being bifurcated at 12 to provide a pair of claws 13. The purpose of these claws will be pointed out as the specification proceeds. A substantially U-shaped spring C has its ends 14 anchored to the lever 5 by any suitable means. For this purpose, I have shown the spring ends 14 passing through openings 15 in the claws. The ends of the springs are curved over in the manner disclosed so as to retain the spring ends in the openings 15 when the spring is assembled.

The sides 16 of the spring C project through the bifurcations 6 and 7 of the jaws A and B, respectively. The spring sides in the region of the jaws are normally disposed adjacent to the tips of the prongs of the jaws (see Figures 1 and 3). A stop 17 is provided on one of the prongs and underlies the spring in order to prevent the latter from flexing outwardly beyond the tips of the prongs.

From the foregoing description of the various parts of the weed puller, the operation thereof may be readily understood. The jaws A and B are arranged in straddling relation with the plant D to be removed. This plant may be a dandelion, which often grows in lawns and has a long tap root 18. The gardener holds the handle 3 and presses downwardly on the lever 5 with his shoe 19, preferably adjacent to the ferrule 2, so as to force the prongs 8 and 9 into the ground. At the same time, the gardener may press downwardly on the handle 3 to assist in forcing the prongs into the ground to the depth shown in Figure 2. During this insertion of the prongs into the ground, the spring C is flexed into increased tension. The free end of the lever 5 is positioned so as to fulcrum on the ground at a point remote from the plant.

The gardener now rocks the handle 3 in the direction of the arrow 20 (Figure 2) after taking his foot from the lever 5, and this will loosen a body of dirt 21 adjacent to the tap root 18. During the swinging movement the jaws will be approximated and engage the root and lift the plant D slightly so as to loosen the tap root. However, it will be noted that the sides 16 of the spring C bear upon the top of the loosened plant and dirt to hold both in place when the prongs subsequently are withdrawn from the ground. As the prongs are moved upwardly, the spring sides 16 continue to press against the top of the loosened plant and ground. Automatic re-straightening of the flexed spring toward the tips of the prongs will clear the bifurcations 8 and 9 of any dirt, mud, weeds, or other fouling material. It is not necessary for the gardener to stoop over to clean the prongs or to use his hands or a stick for cleaning the prongs, since the spring automatically accomplishes the cleaning. As soon as the downward pressure by the gardener is released from the handle 3 and the lever 5, the spring C will urge the jaws upwardly and the cleaning of the jaws is automatically accomplished.

The weed puller now is inverted into the position illustrated in Figure 3, and the claws 14 are engaged with the loosened plant. The gardener pulls upwardly on the handle 3, resulting in easily removing the loosened plant and root.

In assembling the spring C, the curved ends 14 are inserted through the openings 15 in the claws. A pair of pliers, or the like, is now engaged with the end 22 of the spring and the latter is twisted sufficiently to permit the sides 16 of the spring to pass the stop 17. The end 22 of the spring extends in front of the jaw B so that it can be grasped by the pliers. When the pliers are removed, the spring will snap back into its proper form as shown in Figure 1. The spring sides 16 are sufficiently long and resilient to permit the spring to be twisted in this manner without changing the "set" of the spring.

It should be noted that the end 22 of the spring C that projects in front of the jaw B may be pressed upon for freeing the spring in the event that the latter becomes stuck between the prongs of the jaws. This saves the gardener bending over and soiling his hands.

I claim:

1. In a weed puller, a pair of jaws swingably secured together, each jaw being bifurcated to define two spaced-apart prongs, the pronged jaws being adapted to be pressed into the ground in straddling relation with respect to a weed to be removed, a handle extending from one of the jaws, a lever projecting from the other jaw and made to fulcrum on the ground remote from the plant and also arranged to be pressed upon for forcing the prongs of the jaws into the ground, the pronged jaws being movable toward each other to loosen the ground around the plant and coacting to raise the plant, a substantially U-shaped spring having its ends anchored to the lever, the sides of the spring projecting through the bifurcations of both jaws and normally being disposed adjacent to the tips of the prongs but yieldable when the prongs are pressed into the ground, the spring sides adjacent to the prongs being positioned to bear upon the top of the loosened weed and ground to hold both in place when the pronged jaws are withdrawn from the ground, and a stop extending from one of the prongs and underlying the spring to prevent the latter from flexing outwardly beyond the tips of the prongs.

2. In a weed puller, a pair of jaws swingably secured together, each jaw being bifurcated to define two spaced-apart prongs, the pronged jaws being adapted to be pressed into the ground in straddling relation with respect to a weed to be removed, a handle extending from one of the jaws, a lever projecting from the other jaw and made to fulcrum on the ground remote from the plant and also arranged to be pressed upon for forcing the prongs of the jaws into the ground, the pronged jaws being movable toward each other to loosen the ground around the plant and coacting to raise the plant, a substantially U-shaped spring having its ends anchored to the lever near the free end of the latter, the sides of the springs projecting through the bifurcations of both jaws and beyond the jaw carrying the lever, a stop extending inwardly from one of the prongs and spaced from the other prong of the same jaw, the sides of the spring being sufficiently long and resilient to permit the spring to be twisted for passing the stop so as to be positioned thereabove during assembly, the spring sides adjacent to the prongs being positioned to bear upon the top of the loosened weed and ground to hold both in place when the pronged jaws are withdrawn from the ground.

3. In a weed puller, a pair of jaws pivoted together, the jaws being adapted to be pressed into the ground in straddling relation with respect to a weed to be removed, a handle extending from one of the jaws, a lever projecting from the other jaw and made to fulcrum on the ground, the jaws being movable toward each other to loosen the ground around the plant and coacting to raise the plant, a spring having one end attached to the lever and having its other end normally positioned adjacent to the free ends of the jaws, but yielding when the jaws are pressed into the ground, the free end of the spring being positioned to bear against the loosened weed and ground to remove both from between the jaws when the jaws are withdrawn from the ground.

WILSON STEGEMAN.

REFERENCES CITED

The following references are of record in the file of this patent:

UNITED STATES PATENTS

| Number | Name | Date |
|---|---|---|
| 1,226,980 | Linse | May 22, 1917 |
| 2,185,552 | Hecox | Jan. 2, 1940 |